(12) United States Patent
Vollrath

(10) Patent No.: US 6,858,994 B2
(45) Date of Patent: Feb. 22, 2005

(54) TRAFFIC SIGNAL INSTALLATION COMPRISING AN LED-LIGHT SOURCE

(75) Inventor: Edmund Vollrath, Maitanbeth (DE)

(73) Assignee: Monika Sickinger, Oberhaching (DE)

( * ) Notice: Subject to any disclaimer, the term of this patent is extended or adjusted under 35 U.S.C. 154(b) by 134 days.

(21) Appl. No.: 10/296,341

(22) PCT Filed: May 25, 2001

(86) PCT No.: PCT/EP01/06011

§ 371 (c)(1),
(2), (4) Date: May 19, 2003

(87) PCT Pub. No.: WO01/91521

PCT Pub. Date: Nov. 29, 2001

(65) Prior Publication Data

US 2004/0041526 A1 Mar. 4, 2004

(30) Foreign Application Priority Data

May 25, 2000 (DE) .......................... 100 25 821

(51) Int. Cl.[7] .............................. H05B 41/36; G08B 5/00
(52) U.S. Cl. .................................. 315/200 A; 340/331
(58) Field of Search ................................ 315/291, 307, 315/312, 200 A; 340/331, 332, 333, 330; 362/800

(56) References Cited

U.S. PATENT DOCUMENTS 5,850,126 A * 12/1998 Kanbar .................... 315/200 A
6,629,766 B2 * 10/2003 Cathel ........................ 362/183
6,634,779 B2 * 10/2003 Reed .......................... 362/555
6,685,339 B2 *  2/2004 Daughtry et al. ........... 362/251

FOREIGN PATENT DOCUMENTS

| DE | 40 22 498 | 1/1992 |
| DE | 197 29 690 | 1/1999 |
| EP | 0 706 305 | 7/2000 |

* cited by examiner

Primary Examiner—Don Wong
Assistant Examiner—Minh D A
(74) Attorney, Agent, or Firm—Wiggin and Dana LLP; Gregory S. Rosenblatt; Michael K. Kinney

(57) ABSTRACT

A traffic signal installation with an LED light source (2), comprising:

Figure 1:
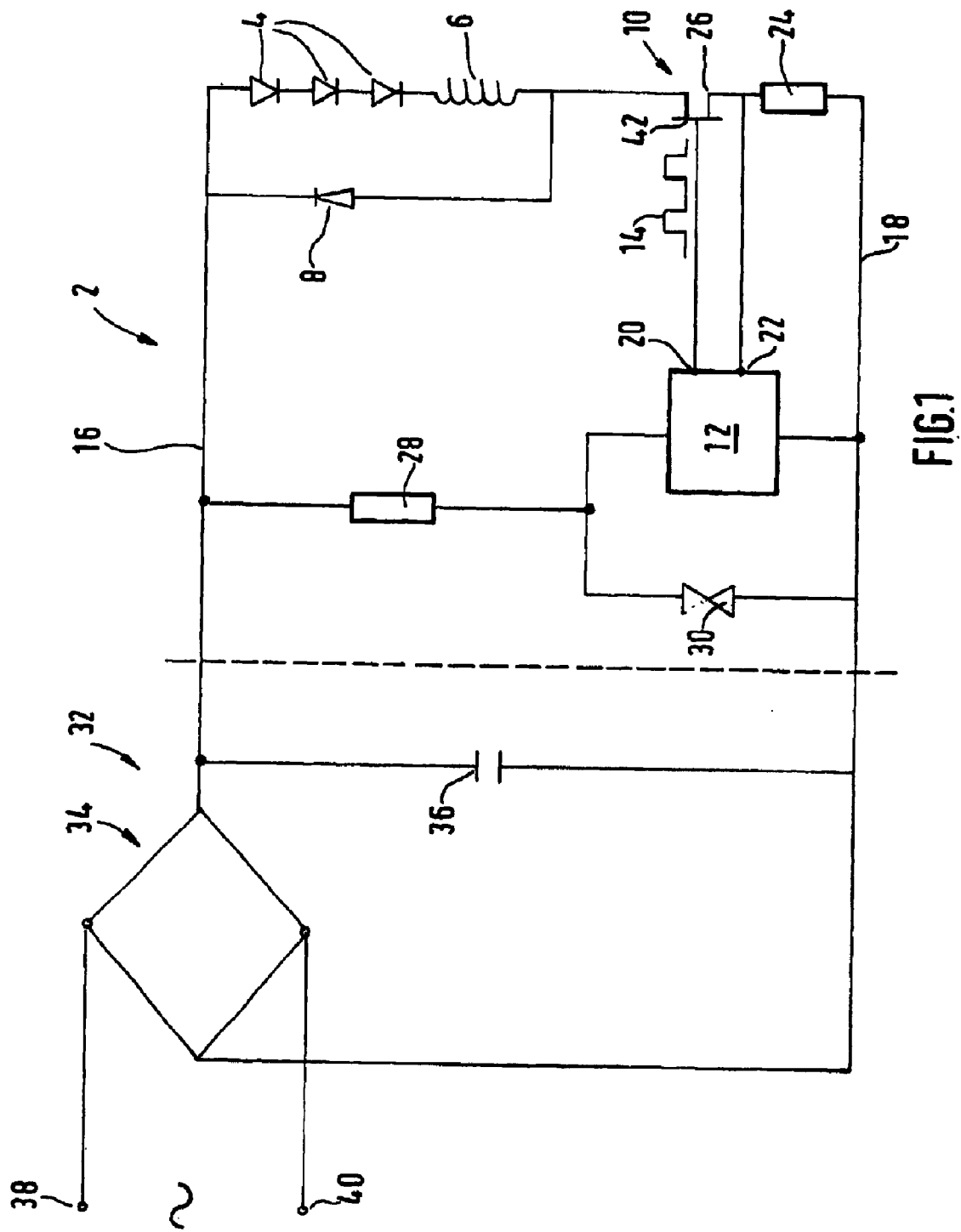

an input (38, 40) for connection of a current source;

furthermore, at potential levels between the upper potential (16) and the base potential (18):

a plurality of LEDs (4) arranged in at least two series connections of several LEDs that are connected in parallel;

a coil (6) provided in series with the LEDs (4);

a recovery diode (8) provided in parallel to the LEDs (4) and the coil (6) and having its forward direction opposed to that of the LEDs (4); and a rapid electronic switch (10) provided in series with the LEDs (4), the coil (6) and the recovery diode (8) in parallel to the LEDs (4) and the coil (6); and a pulse generator (12) that is connected to the rapid electronic switch (12) and generates pulses that open and close the rapid electronic switch (10), said pulse generator (12) being a pulse-width modulator in particular in the form of an integrated component.

23 Claims, 3 Drawing Sheets

TRAFFIC SIGNAL INSTALLATION COMPRISING AN LED-LIGHT SOURCE

The invention relates to a traffic signal installation having an LED light source, in particular an LED light source having a low-loss constant current supply for the LEDs.

Traffic signal installations are in use all over the world. In connection with the present application, the expression "traffic signal installation" basically is to be understood in a broad sense. It is to cover road and rail traffic signal installations as well as shipping route and airplane runway is lighting systems. Especially as regards road traffic signal installations, it is to include also illuminated traffic routing systems and signs in addition to the typical signal installations, such as traffic lights.

Such traffic signal installations are operated typically by municipal or state authorities for which, in addition to the costs for the initial installation, the operating and maintenance costs are a very crucial factor. A considerable cost factor with such traffic signal installations with conventional incandescent lamps is the relatively often required replacement of these lamps. Another cost factor that is not to be neglected is the energy requirement of conventional light sources. In the light of these problems, it has already been suggested to make use of LED light sources in traffic signal installations. For example, U.S. Pat. No. 5,850,126 and DE 197 29 690 A1 describe light signal installations and traffic light installations, respectively, that make use of LED light sources. Both publications suggest a transformer for transforming the voltage from the level of the typical public mains networks down to the clearly lower level permitting sensible use of LEDs. Transformers entail disadvantages for several reasons. Firstly, they are relatively large and heavy, which often causes problems in practical application as regards mounting of the transformer in the traffic signal installation. Both publications indeed suggest mounting of the transformer in the LED light source having a conventional lamp socket. However, in reality these light sources are quite a bit larger than the conventional standard light sources, which often excludes a simple exchange of conventional incandescent lamps for LED light sources. Another item is the not negligible cost factor connected with the utilization of transformers.

On the other hand, DE 40 22 498 A1 describes an explosion-protected signal lamp having a universal power supply unit, the signal lamp showing a few LEDs arranged in series with a coil in parallel to a recovery diode, said LEDs, said coil and said recovery diode being provided in series with a rapid electronic switch. Furthermore, there is provided a pulse generator connected to the rapid electronic switch and generating pulses that open and close the rapid electronic switch. In particular, the pulse generator is a monostable multi-modulator that is composed of a plurality of individual components. Such powering of the LEDs, as compared to the transformer powering of the LEDs chosen in said U.S. Pat. No. 5,850,126 and DE 197 29 690 A1, involves the considerable disadvantage of a clearly increased failure probability of the power supply circuit, which in particular in case of use in traffic signal installations, leads to a considerable disadvantage for reasons of technical safety.

It is therefore an object of the present invention to make available a traffic signal installation of the type described, which has a low-loss, space-saving, fail-safe and inexpensive constant current supply for the LEDs.

To meet this object, the present invention suggests a traffic signal installation with an LED light source, comprising:

an input for connection of a current source;
furthermore, at potential levels between the upper potential and the base potential:
a plurality of LEDs arranged in at least two series connections of several LEDs that are connected in parallel;
a coil provided in series with the LEDs;
a recovery diode provided in parallel to the LEDs and the coil and having its forward direction opposed to that of the LEDs;
and a rapid electronic switch provided in series with the LEDs, the coil and the recovery diode in parallel to the LEDs and the coil;
and a pulse generator that is connected to the rapid electronic switch and generates pulses that open and close the rapid electronic switch,
said pulse generator being a pulse-width modulator in particular in the form of an integrated component.

The invention thus suggests a traffic signal installation and an LED light source which is optimized specifically for use in traffic signal installations and which can be accommodated without a problem within the external dimensions of a standard incandescent lamp for traffic signal installations, which is extremely fail-safe due to the use of an extremely low number of individual components, and which can be manufactured inexpensively due to the use of standard components that are usual in the trade. As the usual dropping resistor for the LEDs can be dispensed with in this circuit and since a power-saving standard component is employed, it is possible to realize low-loss, inexpensive operation of the traffic signal installation.

With a traffic signal installation according to the invention, the replacement intervals can be extended by a factor of 2 or more, resulting in a reduction of the usual maintenance costs by one half or even more. On the other hand, the considerably, lower energy consumption of the LEDs makes itself clearly felt in the current operating costs of such traffic signal installations. Furthermore, there is the fact that, by use of light sources in matching colors, e.g. red, yellow and green LEDs in traffic light installations, the exploitation of energy can be enhanced further. The light loss in the corresponding color filters (filter for green light, filter for red light, filter for yellow light) is Extremely low when the light source has an emission spectrum approximately in the range of the wavelength of the color filter. Nevertheless, it is advantageous to keep the color filters for two reasons. On the one hard, the already mentioned aspect of the simple possibility of exchanging the conventional lamps for the light source according to the invention plays a role here. On the other hand, the filters may serve to drastically reduce stray light, e.g. by radiation of sun. This holds in particular when the filters are matched in their passing range to the very narrow frequency band of the LEDs. In addition thereto, the filters serve as a protection for the LED light source.

Especially in connection with traffic signal installations, the use of the light source with conventional mounting sockets, such as those usual with present light sources in traffic signal installations, are particularly preferred. Preferably, there are provided at least two separate light sources, which may be provided with a usual mounting base, for each luminous field of a traffic signal installation, e.g. the red, yellow or green color field of a traffic light. In case of a defect of one light source, the second light source prevents the occurrence of a total failure.

LEDs—light emitting diodes—have a very high efficiency as regards the conversion of current into light. This efficiency is particularly high in LEDs for green light. But also so-called "white light LEDs" have a very good efficiency, especially in relation to incandescent lamps. The efficiency of especially good LEDs, as already offered in the market nowadays, in part already excels that of fluorescent tubes which in general are deemed to be the light source with the best efficiency. The high efficiency of the LEDs and their highly fail-safe property due to their long operating life render them particularly suitable for certain applications. In addition to typical housing and business premises lighting applications, such applications typically include illuminations of display panels, night lighting e.g. in hotels and hospitals, emergency lighting and similar lighting installations in which a bundled, strong beam of light is not of prime importance. In addition thereto, LEDs have the great advantage that they may be arranged very flexibly so as to form lighting arrangements of two-dimensional and three-dimensional nature. This renders possible large, flat lighting arrangements with uniformly bright illumination across their expanse, which may be utilized in particular for illumination advertising. Especially with illumination advertising, the availability of the LEDs in different colors makes itself felt advantageously.

Differently from incandescent lamps which, depending on their design, can be operated at an arbitrary voltage level, the operating voltage of an LED is fixed within a relatively narrow range due to the physical facts. An LED typically has an operating range of about 2 volts. This property also constitutes a deficiency as regards the use of LEDs for the aforementioned applications. The operating voltage of the LEDs is far away from the mains voltage of typically 110 or 230 volt a.c. voltage delivered by public mains networks. To evade this problem at least to a certain extent, LEDs are frequently operated in a series connection of 20 or more LEDs in succession, which also achieves sufficient light intensity for typical applications. This series connection results in an operating voltage in the range of 40 volts for this group of 20 LEDs connected in series. This value, too, is clearly different from the mains voltage normally available, so that the voltage for LED operation either must be transformed down correspondingly with the aid of a transformer, or a large dropping resistor is employed for bringing the voltage into this range. It is obvious that this voltage matching involves high losses and accordingly, the overall efficiency of an LED light source becomes very poor. The factor further increasing in practical application the distance of the mains voltage available to the operating voltage of the LEDs is the fact that LEDs typically are operated with d.c. voltage. The average value of rectified mains voltage is approx. 150 volts or 320 volts, respectively.

Applications in which the mains voltage is transformed down to the required operating voltage for the series-connected group of LEDs also require a dropping resistor connected in series with the LEDs. Operating the LEDs without such a dropping resistor would have the effect that the current through the LEDs would increase, finally destroying the same. Due to upstream connection of a dropping resistor, the rise in current in the LED is compensated by a higher voltage drop at the dropping resistor.

From this results that the favorable efficiency of the LED for converting current into light is impaired by the operational losses in the dropping resistor and possibly by transformation, which constitutes a massive impediment to the possibilities of use of LEDs. Furthermore, there is the fact that the required operating voltage of typical LED light sources is not suitable for operation at the voltage of the public mains network, especially after rectification, The use of transformers for voltage matching, on the one hand, involves costs and, on the other hand, cannot always be realized easily for reasons of space or is not desirable, whereas a larger dropping resistor results in clearly higher losses.

The main constituent part of the LED light source is the circuit having arranged therein the at least one LED in series with the coil and, parallel thereto, the recovery diode having its forward direction opposed to that of the LED(s). In this circuit, the coil acts as current accumulator. Once charged, it tries to maintain the current flow in the circuit through the LED(s) and the recovery diode. By way of the rapid electronic switch, this circuit is connected to the power source and "charged" in certain intervals. Thus, during operation there is a current applied to the at least one LED that varies around a specific average value of the current with the frequency used for actuating the switch. This current variation may be relatively small as compared to the average value of the current. However, it may also be relatively large. In the extreme case, the at least one LED may be powered using a multiplicity of current pulses having a repetition frequency that is at least so high that the light source is perceived by the human eye to be flicker-free. Between the individual pulses, the current intensity may drop to zero. The energy content of the current pulses is suitably dimensioned such that the energy made available to the at least one LED is in essence equal to the energy required for constant current operation. With such operation, there may even be an improvement in efficiency in practical application, as it is known that LEDs operated with higher current in pulsed manner have a better efficiency in light. By optimum matching of the individual components, the expert can adjust a substantially constant current to the optimum operating current intensity of the LEDs. With this optimum current intensity, an LED has its maximum useful life or its optimum luminous efficiency in relation to its useful life. The optimum current intensity for the optimum lifetime or the optimum luminous efficiency need not necessarily be identical in an LED.

The pulse generator applies to the rapid electronic switch a train of pulses leading to the desired current through the LEDs. The rapid electronic switch may be, for example, a MOSFET transistor, and the pulse trains of the pulse generator may be applied to the gate of the MOSFET transistor.

The additional losses of the components in the LED light source provided in addition to the LED are very low. Losses occur only in the coil, the recovery diode, the switch and the pulse generator. The losses in the coil are in essence merely ohmic losses. With a typical resistance of approx. 6 ohms for the coil, the typical currents of about 20 milliamperes result in a voltage drop of about 120 millivolts across the coil, resulting in correspondingly low losses. Particularly suited as a recovery diode is a Schoftky diode which very rapidly switches to passage and has a low forward voltage. The voltage drop across this diode is about 0.3 to 0.4 volt. The rapid electronic switch typically has a resistance of 1 to 2 ohms. This, too, leads to a voltage drop across the switch in the order of about 20 millivolts only.

The possible energy saving effect shall be illustrated in the following by way of a simple example. The case of conventional operation using a dropping resistor will be compared to the operation according to the invention, using a substantially constant current through the LEDs. The example is based on 20 series-connected LEDs with an LED operating voltage of 2 V, operated at a mains voltage of 230 V alternating current, corresponding to a direct current having a voltage of 320 V. The current through the LEDs is 10 mA.

Conventional operation with dropping resistor:

Effective power at the diodes 20×2 V×0.01 A=0.4 W

Power input 320 V×0.01 A=3.2 W

Efficiency 12.5%

Operation of the circuit according to the invention:

in the entire circuit, it is possible to realize an efficiency of 85%, losses occur in particular in rectification, by operation of the pulse generator, in the electric switch and the further components, Effective power at the diodes 20×2 V×0.01 A=0.4 W/0.85=0.47 W (less than ⅙ of the power input in conventional operation)

Current withdrawn from the mains 0.47 W/230 V=0.002 A

It can easily be seen that the efficiency in operation according to the invention is enhanced approximately by a factor of 7 as compared to conventional operation. This improvement in efficiency can be realized with a simple, inexpensive, reliable and space-saving circuit.

The LED light source can be utilized for illuminations of a large variety of types. As will still be illustrated in the following, it is possible with this light source to create a multiplicity of different colors of light. By using white-light diodes, such a light source may also be utilized instead of conventional incandescent lamps. Particularly preferred are emergency lighting systems, for example in buildings such as underground parking installations, hotels or in vehicles, such as ships, rail-bound vehicles, airplanes. They are especially suitable for uniform, indirect lighting systems, e.g. staircases, underground parking etc. They are suited in particular as fail-safe position lighting means, e.g. for aircraft and ships.

The LED light source may be used e.g. as replacement for conventional, existing light sources. It may have e.g. a conventional threaded, plug-in or other base that can be inserted into conventional sockets. The circuit may be provided e.g. in the socket integrally with the LED. Alternatively, the circuit may be designed separately, as an intermediate piece into which the at least one LED can be inserted or threadedly engaged or otherwise connected thereto. This intermediate piece may either be arranged telescopically, i.e. in the form of a cylindrical jacket, around a core member supporting the at least one LED, with the intermediate piece then being e.g. threaded into a socket or serving itself as a socket for the at least one LED. As an alternative, the intermediate piece may also be connected axially, subsequent to the at least one LED. The specific design is dependent on the specific field of application. Mixed configurations of telescopic and axial design of the intermediate piece are possible as well. For example, in case of a light source adapted to be threaded into a conventional screw-type socket, a mixed form of partly telescopic and partly axial design is expedient, which is arranged around the support of the at least one LED in the manner of a cup. It is to be pointed out that this light source with intermediate piece as well as the intermediate piece alone are each deemed to be inventive as such. In particular, the intermediate piece has indeed a circuit according to claim 1 provided therein, but the light source with the intermediate piece or the intermediate piece alone without the features of claim 1 or only part of the features thereof is deemed inventive as well, e.g. when there is a power supply circuit provided for the LED that is different from the circuit described herein.

It is particularly advantageous to design the light source such that it corresponds in its configuration to a usual light source, e.g. a usual incandescent bulb, rod-shaped, bent neon tubes etc. Especially with light sources in which directional radiation is desired, it is possible with this predetermined form to arrange the LEDs such that the desired light radiation characteristics result. This is particularly favorable with neon tubes used as street lighting or ceiling illumination. In this regard, the present situation is such that the neon tubes themselves are formed like a bent or straight cylinder-shaped tube and have substantially uniform radiation characteristics radially around their longitudinal extension. The street lamps themselves, therefore, are formed with a reflector in order to reflect the light radiated into undesired directions, into the desired direction of radiation. Such reflectors often may become dull, resulting in losses in efficiency and increasing the prime costs. It is therefore advantageous to exploit the directional radiation characteristics of LEDs to the effect that the light source itself is designed in directionally anisotropic fashion such that the desired light radiation characteristics present themselves. The light source may be arranged in a glass bulb, as is usual with LEDs. However, it is also possible to dispense with the glass bulb and leave the at least one LED uncovered. This is advantageous in particular when the light source is covered by the lamp itself towards the outside, e.g. by a glass shade.

It is advantageous, in particular with larger luminous fields, such as the luminous fields of a traffic light or the luminous fields of security illumination systems or neon-tube-like luminous fields, to provide at least two separate light sources per luminous field. This causes a considerable enhancement of the fail-safe characteristics.

As pulse generator, it is possible to use a pulse-width modulator as produced in large numbers of pieces and thus available on the market at low prices. Especially suitable in this regard is the TL 5001 of Texas Instruments. The current demand of such components is in the order of microamperes. The losses are correspondingly low.

As regards the supply circuit, it is favorable furthermore that it is relatively insensitive to variations in input voltage. It is possible to design this circuit such that is operable with the mains voltages of 110 volts and 230 volts a.c. voltage, respectively, without requiring switching over.

The tests performed have revealed that, instead of the LEDs in the circuit, it is also possible to use as loads one or more halogen incandescent lamps. In that event, the coil and possibly also the recovery diode can be dispensed with in the extreme case. The halogen incandescent lamp then is operated solely by application of pulses to the switch. However, the coil has the advantage that the current peaks of the pulses are clearly reduced. For applying the required power to the halogen incandescent lamp, needle pulses with very high current values occur in case of operation without coil. This involves great problems for the filament of the halogen incandescent lamp in particular at the lead-through passages through the socket. The extreme current peaks are reduced considerably by the coil. With this design, too, the great advantage resides in that operation at the voltage of the public mains is possible without transformer.

In addition thereto, it is also deemed inventive to provide arbitrary loads instead of the at least one LED and to supply thereto the pulse-shaped or constant current generated by the circuit.

Preferably, at least one of the LEDs is a "white-light LED". Especially for illumination purposes, in particular illumination at night, white light is particularly preferred. The white-light LEDs may be either such LEDs in which several LEDs of different colors are arranged on a chip in one plane. In this case, typically four LEDs—a red one, a green one and two blue ones—are arranged spatially very close to each other. These LEDs may be operated in series connection. The human eye perceives the light of these LEDs in an additive mixture as one specific color of light, i.e. white light in case of the series connection. It is also possible to operate the LEDs of the individual colors in a separate circuit with separate coil and separate recovery diode. The possibility of controlling the current intensity in the individual circuits provides for the option of varying the color of the light of these LEDs. White-light LEDs have become available recently, which are blue LEDs coated with phosphorous. Due to the blue radiation of the LEDs, the electrons in the phosphorous are excited to higher energy levels and generate the white light when returning to the original state.

Preferably, the pulse generator is designed such that it is capable, in accordance with a characteristic quantity of the current flowing through the LEDs, of applying different pulse trains to the rapid electronic switch in order to maintain the average current through the LEDs within a constant range. Standard components, as mentioned hereinbefore, frequently have a feedback input permitting the pulse train to be changed in accordance with a specific control variable. In the instant case, this may be utilized for keeping the current constant in a specific range. In practical realization of the present invention, this has the advantage that the stability of the current delivered by the circuit is improved, e.g. in case of temperature changes. With simple components that do not permit an alteration of the pulse train in different manner, this feedback input may also be utilized for setting the current intensity to the desired optimum value.

Preferably, there is provided an overall current measuring resistor in series with the rapid electronic switch, the coil and the LEDs, through which the current flowing through the LEDs is measured. This measuring resistor may be of almost arbitrary small design so that, here too, there are very low losses only. In particular, this measuring resistor is clearly smaller than typical dropping resistors as employed in the usual LED applications. In this regard, the voltage dropping across the measuring resistor is characteristic of the current flowing through this measuring resistor.

The voltage dropping across the measuring resistor may be supplied, e.g. to an operational amplifier which, depending on the variable ascertained, issues a corresponding signal to the pulse generator in order to thus correctly act on the rapid electronic switch in accordance with the value ascertained at the measuring resistor.

The parallel arrangement of several LEDs has a number of advantages. It is as a rule favorable for generating sufficient light intensity to provide a multiplicity of LEDs jointly. For the reasons indicated hereinbefore, such LEDs typically are often arranged in series connection. The disadvantage of the series connection resides in that, in case of failure of one LED, the entire series fails and does no longer generate light. To prevent complete failure of the LED light source in such a case, it is advantageous to connect individual LEDs or series of LEDs in parallel to each other. If, in case of two or more LEDs connected in parallel or two or more series of LEDs connected in parallel, one LED or a series of LEDs becomes defective, there is indeed a higher current flowing through the remainder of the LEDs, but the LED light source does not fail completely. The higher current in general results in a reduction of the useful life of the partially damaged LED light source. The user has a certain "grace period" left until the LED light source has to be replaced finally. This is advantageous in particular in applications where safety is of relevance, since total failure of the LED light source announces itself a certain period in advance. It may be particularly advantageous to arrange several series or rows of LEDs parallel to each other. Failure of one single series does not cause a considerable increase in current flow through the remaining series, so that the useful life thereof does not decrease rapidly. The LED light source concerned may already be replaced long before actual failure thereof. An examination of such a light source can be effected by measuring the resistance in each of the individual parallel LED series. Depending on the number of series or rows that have become defective up to that time, the engineer then may decide during an examination whether or not the LED light source has to be replaced. This is particularly expedient when the LED light source is used in traffic signal installations. In the extreme case, it is even possible to provide all LEDs parallel to each other.

Preferably, it is possible in the individual parallel current paths having one or more LEDs each, to detect a value that is characteristic of the current flowing along this specific current path. This may be effected, for example, with the aid of a partial current measuring resistor in series with the at least one LED in such a current path. In particular with few parallel current paths, it is thus possible to determine the failure of an LED in a current path. With the aid of a suitable logic system, these characteristic values are detected and evaluated, and the overall current flow and thus the current flow through the remaining LEDs, by way of the pulse generator, are reduced to a relatively lifetime-saving value for the remaining LEDs or even returned to the optimum value for these LEDs. For example, with only two parallel current paths each having at least one LED provided therein, the characteristic value of one of these current paths is sufficient. If, for example, the characteristic value in one of these current paths drops to zero, it is evident that an LED has become defective in this current path. The current flowing through the second current path may then be lowered accordingly. Conversely, the current may be reduced accordingly if the characteristic value increases suddenly in this current path. In case of several parallel current paths, it is advantageous to detect the characteristic value of each individual current path.

Preferably, the pulse generator receives its current supply by being connected to the high potential and the base potential. Between high potential and base potential, there is preferably provided a voltage divider having a stabilization diode provided in parallel to the pulse generator for generating a substantially constant supply voltage for the pulse generator. Basically, it is also possible to compose a voltage divider e.g. of two resistors. However, the voltage divider with stabilization diode has the advantage that it makes available a substantially constant voltage for the pulse generator independently of the voltage dropping between high potential and base potential. The reason therefor is again the possibility of using the light source without a problem for the public mains with 110 volts or 230 volts a.c. voltage, respectively. This is advantageous specifically also under commercial aspects when one type of LED light source can be used all over the world.

Preferably, the pulse generator for power supply has a power supply input connected to the series connection of load output, rapid electronic switch and coil. As compared to the alternative described hereinbefore, in which the power supply of the pulse generator is taken from the supply voltage via a voltage divider, this type of circuit has the advantage hat it is particularly energy-saving since the losses that automatically result at the voltage divider are virtually completely minimized. It is preferred in this regard that a voltage regulating circuit is connected upstream of the voltage supply input of the pulse generator. The voltage regulating circuit has the function of smoothing the relatively non-uniform voltage present at the supply output, before the same is fed to he integrated circuit of the pulse generator.

It is preferred in this regard that the voltage regulating circuit has an de-coupling capacitor. This is favorable in particular when the voltage tapped via the output, in comparison with the voltage necessary for the integrated circuit that is in the range of a few volts, varies around a relatively high d.c. voltage value. The decoupling capacitor in this case filters out the relatively high d.c. components and permits the passage of a.c. components only. Furthermore, it is preferred with respect to the voltage regulating circuit that a voltage rectifier, e.g. a rectifier diode, is provided that does not permit passage of the negative components of the a.c. voltage following the decoupling capacitor or changes the sign thereof. It is particularly expedient in this regard to have a level diode connected between decoupling capacitor and voltage rectifier, which shifts the voltage level of the a.c. voltage subsequent to the decoupling capacitor such that said voltage has substantially no more negative components.

It is even more preferred that the voltage regulating circuit has a voltage regulator IC. There are integrated circuits, for example an A78L05CD standard IC available from numerous manufacturers, which effect further smoothing of the voltage thus processed and permit use as power supply for the integrated circuit constituting the pulse generator.

Preferably, the LED light source is provided for connection directly to the public mains and has a rectifier circuit the outputs of which constitute the high potential and the base potential. Such a rectifier circuit may be, for example, a conventional bridge circuit, with a capacitor for smoothing the voltage peaks between high potential and low potential being preferably connected thereto in addition. In case of applications outside the public mains, e.g. on ships, in aircraft, in motor vehicles or other means, e.g. in computers or other electrical installations that either have an independent d.c. voltage network or internally provide current of a specific d.c. voltage, a rectifier may also be dispensable.

The pulse generator preferably is designed such that the repetition frequency of the pulses is higher than 70 Hz; pulses below this threshold are perceivable to the human eye and are not well suited for illumination purposes. In applications where a blinking signal has to be issued, however, a lower repetition frequency is possible as well and may be advantageous. However, the repetition frequency preferably is higher than 130 Hz, more preferably higher than 400 Hz, still more preferably higher than 1 kHz and even more preferably higher than 10 kHz. Very much preferred are repetition frequencies of more than 100 kHz. The higher the frequency, the smaller the coil may be dimensioned, so that the circuit can thus be designed correspondingly smaller. This is important since the coil is a relatively bulky component of this circuit. In addition thereto, coils are increasingly expensive with increasing inductance. The coil preferably has an inductance of 0.1 to 100 mH. Particularly expedient are coils with an inductance of 1 to 100 mH. A more accurate indication of the inductance of the coil is not possible as a matter of principle. It is dependent on the LED arrangement specifically chosen, the supply voltage, the pulse frequency and other factors. The value thereof may vary by a factor of 1000 for different applications and arrangements.

Preferably, the pulse generator is designed to be adjustable so that the intensity of the light can be varied by changing the pulse trains. The possibility of dimming illumination, i.e. changing the brightness thereof, is often desirable. In practical application this can be realized by varying either the spacing between individual pulses, i.e. the pulse intervals, or the duration of the pulses.

Preferably, the light source described, i.e. the arrangement of LED(s), coil, recovery coil, electric switch, pulse generator, possibly rectifier circuit etc., is provided with a usual mounting base that may be used together with a usual mounting socket. It is thus possible, without change in the existing lighting structure, to replace lamps usual so far, e.g. incandescent lamps, by the light source according to the invention.

Furthermore, it is particularly preferred to provide for a possibility of varying the intensity of the light. It is easily conceivable that, for traffic signal installations, the illumination intensity during day and night operation can and has to be clearly different. During day operation, there must be a relatively high intensity to ensure safe recognition of the signal state also in case of exposure to a very low sun. During night, however, care is to be taken that the illumination intensity is not excessively high to safely prevent glaring of road users, The dimming effect described may be used to advantage here. It is even advantageous to detect the intensity in accordance with the actual light situation for each particular moment, e.g. with the aid of a photo cell, and to match the currently required light intensity of the signal installation on the basis of this information, e.g. automatically. Even during the day, such regulating measures only rarely require such operation of the signal installation that calls for the highest intensity of the light source. The afore-mentioned energy savings thus can still be increased considerably.

LED lighting means are particularly suited as working lamps, especially in situations requiring relatively intensive and relatively directional light, and especially in situations in which the additional heat generated by conventional light sources is extremely undesirable. In this connection, dentists' lamps are to be mentioned in particular which, particularly preferred as LED lighting means and in particularly preferred manner powered by the device according to the invention, are clearly superior to the lamps used so far.

For LED lighting applications, the increasingly employed chip-on-board technology is particularly suitable, in which the individual LEDs are arranged on a base plate without a housing of their own and are covered by a thin silicon layer. There may be provided up to approx. 500 LEDs on one board.

The LED light source described in connection with the traffic signal installation is also suited for other applications, as was already pointed out hereinbefore. Furthermore, the supply circuit for feeding the LEDs, as used in the traffic signal installation according to the invention, is suitable also for other purposes than lighting purposes, especially in situations in which the use of transformers is not desirable for a variety of reasons. Furthermore, it is pointed out that all of the features mentioned may each also be realized in technically sensible manner in supply current sources of any design, independently of the overall subject matter of claim 1.

Figure 2:
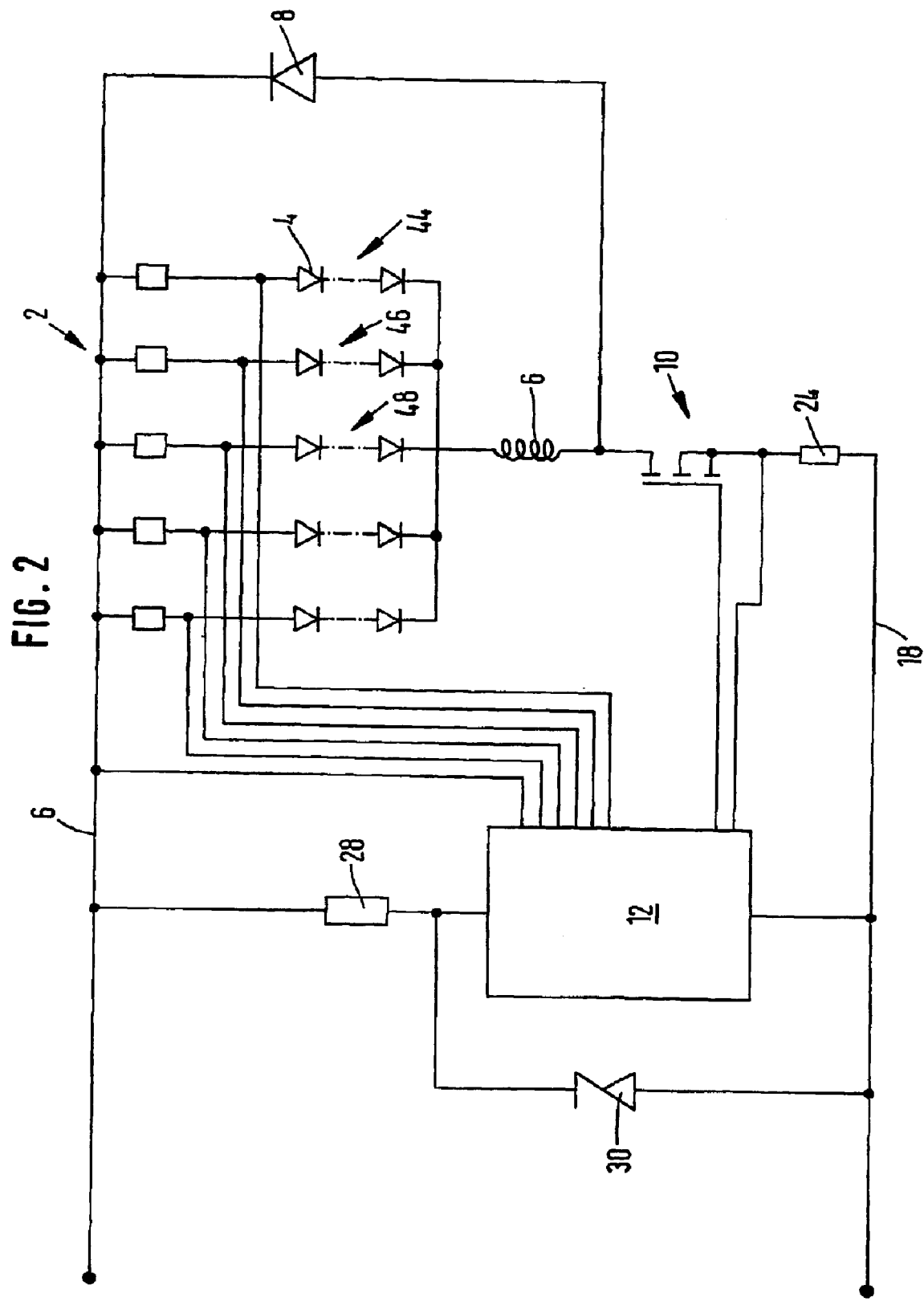
Figure 3:
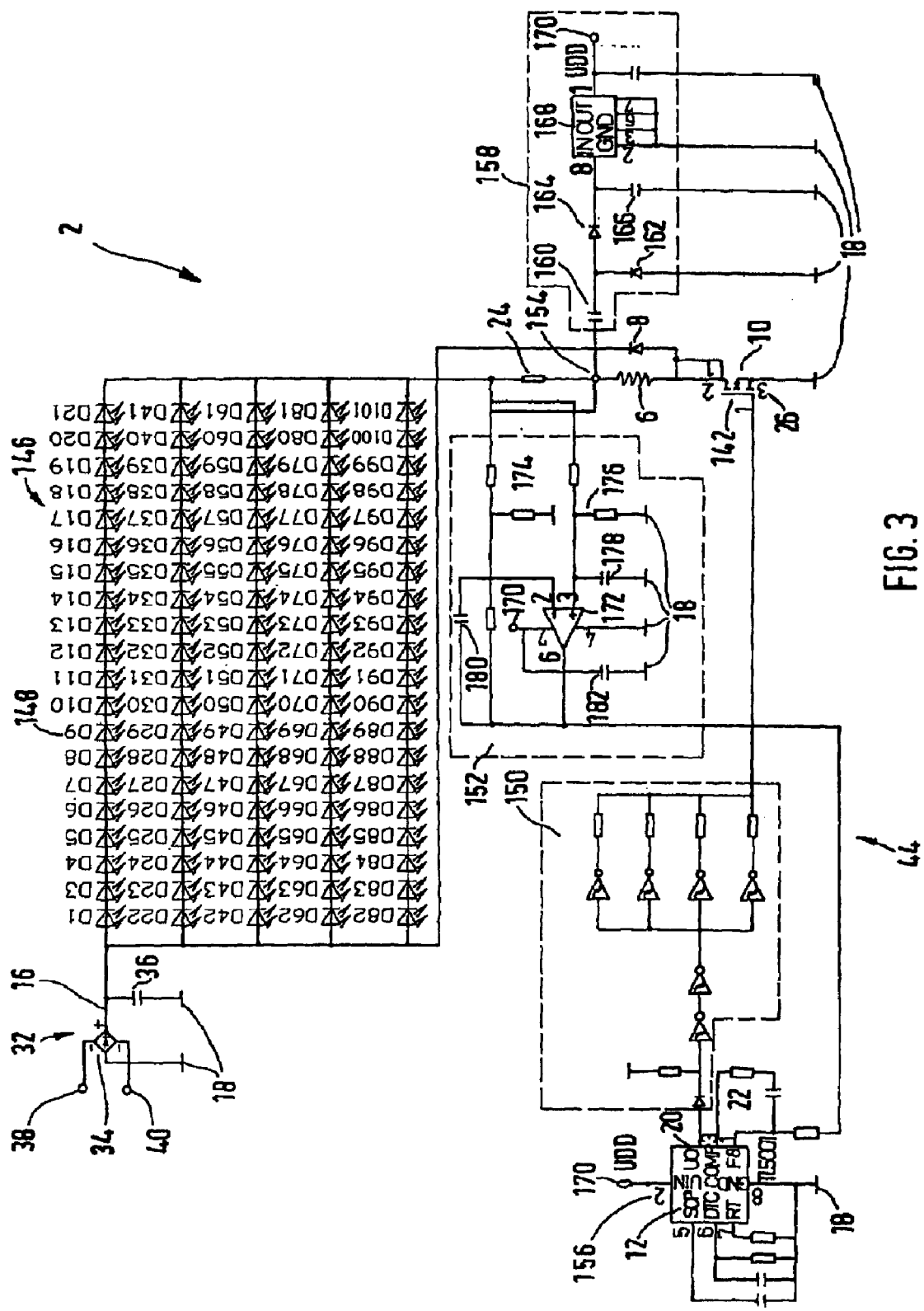

The invention and further developments of the invention will be explained in more detail hereinafter by way of an embodiment shown in the drawings, in which FIG. 1 schematically illustrates the structure of an LED light source;

FIG. 2 schematically illustrates the structure of an alternative embodiment of the LED light source; and FIG. 3 shows the circuit configuration of an LED light source having an alternative power supply means, FIG. 1 shows an LED light source 2 for a traffic signal installation according to the invention, comprising a plurality of series-connected light-emitting diodes (LEDs) 4 connected in series with a coil 6. Arranged in parallel to the LEDs and the coil 6 is a recovery diode 8 such that its forward direction is opposed to that of the LEDs 4. Arranged in series with the LEDs 4, the coil 6 and the recovery diode 8 parallel thereto, is a rapid electronic switch 10 having a pulse train 14 applied thereto by a pulse generator 12. If, instead of the LEDs 4, there is provided a different load, e.g. a halogen incandescent lamp, that has no defined forward direction, a blocking diode may be provided in addition in series with the load in order to define the forward direction of the load.

The rapid electronic switch 10 itself may be, for example, a transistor, and in particular a MOSFET transistor. N-channel MOSFETs have turned out to be particularly suitable since these are less expensive on the one hand and are capable of faster switching on the other hand, as compared to a p-channel MOSFET having the same electric load-carrying capacity. For avoiding losses, the rapid electronic switch 10 in the conducting state thereof should have a very low resistance only. In addition thereto, it should have especially short switching-on and -off times so as to render possible a particularly steep edge increase and decrease of the current pulses.

The specific type and number of the LEDs 4 is selected in accordance with the intended use. LEDs are available in a large variety of different colors and with a large variety of different operating data. There are so-called "white light LEDs", delivering white light as is particularly desirable for some lighting purposes.

Particularly suitable as recovery diode is a Schottky diode because of its high switching speeds and its low forward voltage. However, it is basically also possible to provide different diodes, preferably fast recovery diodes.

In accordance with conventions, the upper bus or bar 16 in the circuit is at high potential, whereas the lower bus or bar 18 is at reference potential or base potential, e.g. ground.

The pulse generator 12 may be a usual component as distributed and manufactured conventionally in large numbers of pieces. Preferably, it is adapted to generate a pulse train 14 that is variable. For example, the pulse lengths may be variable, i.e. pulse width modulation is possible. Alternatively, it is also possible, with constant pulse width or pulse duration, to vary the interval between the individual pulses. The pulse generator 12 has an output 20 for the pulse train 14 and a so-called feedback input 22 via which a characteristic signal for the current flowing through the LEDs 4 is fed to the pulse generator 12. To this end, there is provided an overall current measuring resistor 24 between source 26 of the rapid electronic switch 10 and base potential 18. The overall current measuring resistor may be of relatively small dimensioning.

For power supply, the pulse generator 12 is connected to a voltage divider composed of a plain resistor 28 and a Zener diode 30. The Zener diode 30 has the effect that a substantially constant voltage is supplied to the pulse generator 12. On the left-hand side of the broken line in FIG. 1, there is shown the rectifier circuit 32 that is composed in essence of a usual bridge circuit 34 and a smoothing capacitor 36. An alternating voltage, e.g. normal mains voltage, can be applied to the inputs 38, 40.

During operation, the rapid electronic switch 10 opens and closes in clock-pulse controlled fashion by the pulse train 14 applied to the gate 42 of the rapid electronic switch 10. When the rapid electronic switch 10 is closed, current can flow from the high potential 16 through the LEDs 4 and the coil 6 and via the rapid electronic switch 10 to base potential 18. In doing so, coil 6 is charged and forms a magnetic field. When the rapid electronic switch 10 is opened, i.e. the current flow is interrupted, the charged coil 6 further propels the current flow, and the current flows through the recovery diode 8 back to high potential. Thus, the current flow in this circuit is generally maintained as long until the load has withdrawn the energy from the circuit, i.e. the energy stored in the magnetic field of the coil 10 has been depleted. When the rapid electric switch 10 closes again, the current again begins to flow through the LEDs 4, the coil 6 and the rapid electric switch 10 from high potential 16 to base potential 18, and coil 6 is charged anew.

FIG. 2 illustrates an alternative embodiment. It can be seen that there are several series 44, 46, 48 of LEDs 4 provided in parallel to each other. In the embodiment illustrated, all of the series 44, 46, 48 of LEDs 4 have a common coil 6. As compared to an embodiment having one coil 6 per series 44, 46, 48 of LEDs, such a structure has a number of advantages. By reducing the number of costly coils 6, it is considerably less expensive and may also be built in smaller size in practical application. In addition thereto, in the embodiment shown, each series 44, 46, 48 is provided with a partial current measuring resistor 50 of its own. As for the rest, the structure of the circuit according to this figure is relatively similar to the structure according to FIG. 1. As in case of FIG. 1, there is also provided an overall current measuring resistor 24, which however may be omitted optionally. It can be seen how an information line 52 extends from each of the partial current measuring resistors 50 to the pulse generator 12, The pulse generator 12 thus receives information on the current flow through the LEDs from each individual series of LEDs. It is thus rendered possible, e.g. in case of failure of one LED in a series, thus completely preventing a current flow through this series, to maintain the optimum current flow from the pulse generator 12 for the remaining series of LEDs. The pulse generator 12 to this end comprises an evaluation means, provided in integrated fashion or as a separate component, for example in the form of an integrated circuit. This integrated circuit at the same time may be composed such that it generates e.g. an error signal in case of failure of one of the series of electrodes. This error signal may be e.g. of stepped form, so that the error intensity varies depending on whether one or more series of LEDs have become defective. The error signal may be recognizable e.g. to an engineer during a routine check. However, it may also be fed to a central monitoring unit via a data communication. Such "remote maintenance", in particular for traffic signal installations such as traffic lights, permits considerable savings in the current maintenance costs.

It is to be pointed out that the LEDs belonging to a series 44, 46, 48 do not necessarily have to be arranged in series with each other on the illumination side, i.e. in the lighting arrangement, as well. Rather, it may be expedient to distribute the LEDs 4 of a series 44, 46, 48 across the overall arrangement of the individual LEDs, so that failure of an individual electrical series does not become so easily evident to an observer of the LED light source.

FIG. 3 illustrates the circuit diagram of a light source 144 according to the invention, which is composed using an alternative power supply means according to the invention. The luminous field 146 of the light source 144 is composed of a multiplicity of individual LEDs 148 arranged in total in five parallel series or rows. The device according to FIG. 3 basically corresponds to the respective device of FIG. 1 or 2. Accordingly, identical reference numerals are used to designate alike or similar components and features. In particular, at the upper left, one can see the rectifier circuit 32 and, further towards the right-hand side, the coil 6, the rapid electronic switch 10, the recovery diode 8 as well as the measuring resistor 24. The pulse generator 12 along with the output 20, via which the pulse train 14 is applied to the gate 42 of the rapid electronic switch 10, as well as the feedback input 22 are shown as well. Between output 20 and gate 42, there is shown a driver circuit 150 in broken lines, which is used to generate a high current for overcoming an input capacitance of the rapid electronic switch 10. Also in broken lines, there is shown an operational amplifier circuit 152 which generates and delivers the feedback signal proper to the pulse generator 12. Instead of the operational amplifier circuit 152, a linear opto-coupler may also be used advantageously for potential separation.

In series with the load, i.e. the diode field 146, there is shown a terminal 154 connected via a voltage regulating circuit 158 to the power supply input 156 of the pulse generator. This constitutes the essential difference of the present circuit as compared to the circuit of FIG. 1 or 2. When the circuit according to FIG. 1 or 2 is used for powering the luminous diode field 146, the losses in the resistor 28 of the voltage divider are about as high as the current consumption of the entire luminous diode field 146.

The overall circuit indeed still has an extremely good efficiency in generating light. However, this extremely good efficiency can be enhanced further by avoiding these pure losses at resistor 28. In case of FIG. 3, this problem is overcome in that the power supply input for the pulse generator 12, instead of the upper potential 16, is connected to the series connection of load 146, measuring resistor 24, coil 6 and rapid electronic switch 10 at terminal 154. The voltage regulating circuit 158 comprises a decoupling capacitor 160, a level diode 162, a rectifier diode 62 as well as a smoothing capacitor 166, which are connected upstream of a voltage regulator IC 168.

The output of the voltage regulator IC is connected to a supply voltage bus 170 from which power is fed to the pulse generator 12 via the power supply input 156 on the one hand, but also to the operational amplifier of the operational amplifier circuit 152 on the other hand, as will still be described hereinafter.

The operational amplifier circuit 152 comprises said operational amplifier as main constituent part. In the lead to the operational amplifier 172, there are arranged voltage dividers 174, 176. Furthermore, in one of the leads, there is provided a capacitor 178 as integration or smoothing capacitor 178. Capacitor 180 has a similar function. An additional capacitor 182 is provided to avoid parasitic oscillations of the operational amplifier 172.

There are various possibilities of operating the power supply device 2. On the one hand, it may be expedient to deliver an as constant as possible current at the LEDs 4 or the load output. The extreme case opposite thereto is pulsed operation of the load with current pulses, with the current each time dropping to zero between the individual pulses. By corresponding choice of the components, each of the two modes of operation can be achieved. Furthermore, it is also possible to choose the operation by way of the pulse generator 12, i.e. the width of the individual pulses, the length of the pulse intervals and the pulse duty cycle. It may be expedient to this end to provide an additional measuring resistor in the circuit of the load output 4, the coil 6 and the recovery diode 8, and to tap at said additional resistor a quantity that is characteristic of the current in this circuit. This voltage may be fed to a logic circuit and drive the pulse generator 12 in corresponding fashion. This type of monitoring the current flow via the load output provides for the specific advantage that a very defined current can be outputted to the load, which can safely be held within a very specific range or a very specific level. Some loads requiring a very defined power supply can be fed very well and reliably thereby, which in turn clearly enhances operational safety and useful life of such devices.

Usually, a mode of operation will be chosen in which the current at the load increases to a maximum value when the switch is turned on, and then decreases again before, prior to reaching the zero line, the switch is opened again and the current at the load increases again. The current thus fluctuates around the average value of the required operating current of the load, in essence with the frequency used for actuating the rapid electronic switch 10.

The power supply device 2 may be provided as a separate power supply unit. However, it may just as well be integrated into the electronic apparatus, e.g. in the housings thereof. In case of halogen incandescent lamps or other lamps, for example, it may be provided in particular in the sockets thereof. Especially in cases where the loads are operated in the public mains, it is expedient to integrate the rectifier circuit 32 in the power supply device 2.

What is claimed is:

1. An LED light source, comprising:
   (a) an input for connection of a current source;
   (b) furthermore, at different potential levels between the upper potential and the base potential;
   a string of a plurality of LEDs connected in series;
   a coil provided in series with the LEDs;
   a recovery diode provided in parallel to the LEDs and the coil and having its forward direction opposed to that of the LEDs;
   and a rapid electronic switch provided in series with the LEDs, the coil and the recovery diode in parallel to the LEDs and the coil; and
   (c) a pulse generator that is connected to the rapid electronic switch and generates pulses that open and close the rapid electronic switch,
   wherein
   (d) there are provided several parallel-connected strings each containing several series-connected LEDs;
   (e) there is provided a common coil for said strings of LEDs; and
   (f) the pulse generator is a pulse-width modulator in the form of an integrated component or a frequency modulator in the form of an integrated component.

2. The light source of claim 1, wherein the pulse generator is designed such that it capable of applying different pulse trains to the rapid electronic switch in accordance with a characteristic quantity of the current flowing through the LEDs, so as to maintain the average current through the LEDs within a constant range.

3. The light source of claim 2, wherein an overall current measuring resistor is provided in series with the rapid electronic switch, the coil and the LEDs, by means of which the current flowing through the LEDs is measured.

4. The light source of claim 1, wherein a partial current measuring resistor is arranged in series with at least one of the LED strings.

5. The light source of claim 1, wherein the pulse generator is connected to the high potential and the base potential.

6. The light source of claim 5, wherein between said high potential and said base potential, there is provided a voltage divider having a stabilization diode arranged in parallel to the pulse generator for generating a substantially constant supply voltage for the pulse generator.

7. The light source of claim 1, wherein the pulse generator has a power supply input connected to the series connection of the output of the LEDs and the coil.

8. The light source of claim 7, wherein a voltage regulating circuit is connected upstream of the voltage supply input of the pulse generator.

9. The light source of claim 8, wherein the voltage regulating circuit comprises a decoupling capacitor.

10. The light source of claim 8, wherein the voltage regulating circuit comprises a voltage rectifier.

11. The light source of claim 10, wherein the voltage regulating circuit comprises a level diode connected upstream of the voltage rectifier.

12. The light source of claim 8, wherein the voltage regulating circuit comprises a voltage regulator IC.

13. The light source of claim 1, wherein it is provided for connection to the public mains and comprises a rectifier circuit the outputs of which constitute the high potential and the base potential.

14. The light source of claim 1, wherein the pulse generator is designed such that the repetition frequency of the pulses is greater than 130 Hz.

15. The light source of claim 1, wherein the pulse generator is designed such that the repetition frequency of the pulses is greater than 400 Hz.

16. The light source of claim 1, wherein the pulse generator is designed such that the repetition frequency of the pulses is greater than 1 Hz.

17. The light source of claim 1, wherein the pulse generator is designed such that the repetition frequency of the pulses is greater than 10 Hz.

18. The light source of claim 1, wherein the pulse generator is designed such that the repetition frequency of the pulses is greater than 1 Hz.

19. The light source of claim 1, wherein the pulse generator is designed to be adjustable such that the intensity of the light can be varied by variation of the pulse trains.

20. The light source of claim 19, wherein the pulse generator is adjustable automatically in accordance with the prevailing light situation.

21. The light source of claim 1, wherein a usual mounting base is provided for use together with a usual mounting socket for light sources.

22. The light source of claim 1, wherein a common coil and a common recovery diode are provided for several strings connected in parallel.

23. A traffic signal installation having at least one LED light source, comprising: in said LED light source:
   (a) an input for connection of a current source;
   (b) furthermore, at different potential levels between the upper potential and the base potential:
   a string of a plurality of LEDs connected in series;
   a coil provided in series with the LEDs;
   a recovery diode provided in parallel to the LEDs and the coil and having its forward direction opposed in that of the LEDs; and
   a rapid electronic switch provided in series with the LEDs, the coil and the recovery diode in parallel to the LEDs and the coil; and
   (c) a pulse generator that is connected to the rapid electronic switch and generates pulses that open and close the rapid electronic switch;
   wherein:
   (d) there are provided several parallel connected strings each containing several series-connected LEDs;
   (e) there is provided a common coil for said strings of LEDs; and
   (d) the pulse generator is a pulse-width modulator in the form of an integrated component or a frequency modulator in the form of an integrated component.

* * * * *